United States Patent [19]

Peterson et al.

[11] Patent Number: 4,783,039

[45] Date of Patent: * Nov. 8, 1988

[54] SHOCK ISOLATING MOUNT

[75] Inventors: Francis C. Peterson, Woodbury; Lorenzo Perosino, Waterbury; Robert J. Despins, Madison, all of Conn.

[73] Assignee: Buell Industries, Inc., Waterbury, Conn.

[*] Notice: The portion of the term of this patent subsequent to Jan. 12, 2005 has been disclaimed.

[21] Appl. No.: 90,033

[22] Filed: Aug. 27, 1987

Related U.S. Application Data

[63] Continuation-in-part of Ser. No. 890,905, Jul. 28, 1986, Pat. No. 4,720,075.

[51] Int. Cl.$^4$ ............................................. F16M 13/00
[52] U.S. Cl. ..................................... 248/635; 248/634; 267/281; 296/35.1
[58] Field of Search ............... 248/635, 634, 560, 638, 248/632; 296/351; 267/281, 283, 141.1, 153; 180/89.12; 403/390; 411/969, 965, 147

[56] References Cited

U.S. PATENT DOCUMENTS

| 2,144,170 | 1/1939 | Utz et al. | 296/35.1 |
| 2,520,757 | 8/1950 | Cain | 248/632 |
| 2,708,560 | 5/1955 | Paley | 248/632 X |
| 3,128,999 | 4/1964 | Schmitt | 267/153 |
| 3,608,601 | 9/1971 | Gohs | 411/147 X |
| 4,014,588 | 3/1977 | Kohriyama | 296/35.1 |
| 4,286,777 | 9/1981 | Brown | 296/35.1 X |
| 4,513,990 | 4/1985 | Morita et al. | 267/281 X |
| 4,720,075 | 1/1988 | Peterson et al. | 248/635 |

FOREIGN PATENT DOCUMENTS 0586608 3/1947 United Kingdom ............. 267/141.3

Primary Examiner—Ramon O. Ramirez
Attorney, Agent, or Firm—St. Onge Steward Johnston & Reens

[57] ABSTRACT

An improved shock isolating mount is designed for securing a body part of vehicle to a support. The shock mount comprises a two-part spool that includes: a spacer formed from an annular flange integral with a tube, the tube projecting through apertures in mating elastically resilient bodies and a support part of a vehicle body part disposed between them; a thimble, formed from a flange integral with a tube designed such that the thimble tube can telescope into the spacer tube. The thimble tube is formed into a polygon shape at the tube shoulder adjacent the thimble flange and the spacer tube is formed in a matching polygon shape such that the thimble tube shoulder can mate with the spacer tube to prevent relative rotation of the thimble and spacer. The thimble tube has an enlarged end which is engaged by a plurality of inward protrusions mounted in the spacer tube to prevent the spacer and thimble assembly from accidental disengagement. The thimble has welded to its flange a nut to engage a threaded fastener inserted through the body part, through the spool tube, and into the thimble tube and nut. When tightened, the fastener draws the flanges of the spacer and thimble together to simultaneously securely clamp the support part of the vehicle body and secure the mounting part to the shock mount and the vehicle frame.

18 Claims, 2 Drawing Sheets

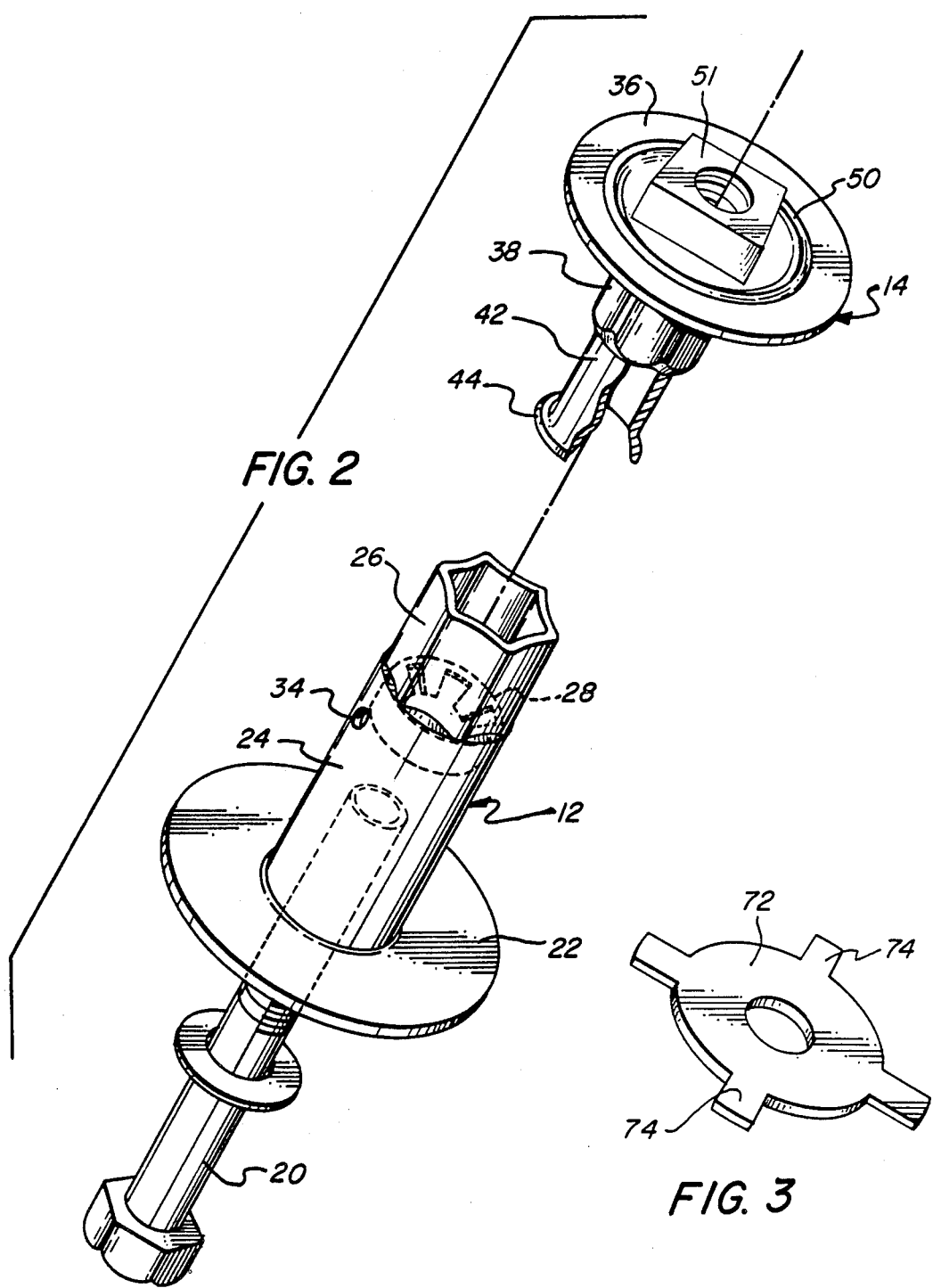

SHOCK ISOLATING MOUNT

BACKGROUND OF THE INVENTION

The present Application is a continuation-in-part of Application Ser. No. 890,905, filed July 28, 1986 now U.S. Pat. No. 4,720,075 by Francis C. Petersen, Lorenzo Perosino and Robert Despins.

FIELD OF THE INVENTION

The present invention relates to an improved assembly, referred to as a shock mount, for securing part of a heavy structure, such as a vehicle body, to a support, such as the frame of the vehicle, and absorbing vibrations or shocks between the two structures.

DESCRIPTION OF THE PRIOR ART

A well known shock isolating mount currently used in the automotive industry for securing and supporting the body or cab of a vehicle on its frame comprises two mating rings of elastically resilient material between which a body mounting part such as an ear protruding from the vehicle is engaged and clamped by a two-part spool that is seated on the vehicle frame and fixed to it by a threaded fastener. The spool parts have flanges which bear against the opposite sides of the mating rings and are threaded together so that by turning one spool part relative to the other the elastic rings and the body mounting part between them are clamped tightly between the flanges. One of the spool parts is a tubular spacer having an annular flange integral with a deep drawn tube that is internally left hand threaded. The other spool part is a thimble having an annular flange integral with a deep drawn tube that is externally left-hand threaded to fit inside and engage its thread with the screw thread of the tubular spacer. A torque nut is welded to the outer face of the thimble flange.

The mating elastic rings of the prior art are provided with an oblong projection and an oblong cavity so that they may be mated only when the projection and cavity are properly aligned.

This known shock mount is assembled by inserting the spacer tube through the center of one of the mating elastic rings, and through an opening in the body mounting part. The second mating elastic ring is then fitted over the end of the spacer tube. The end of the thimble tube is placed in the end of the spacer tube, and the thimble is turned to thread it into the spacer tube and clamp the elastic rings tightly together on the body mounting part. Then, the spool assembly and body part is seated in place on the vehicle frame, and the threaded fastener is passed up through an opening in the frame, through the tubes and the assembled spool parts, and is threaded into the nut welded onto the thimble until the entire assembly is fixed securely to the frame.

It has been found that several practical drawbacks impede effective fastening by the prior art assembly.

During production line assembly of the spool parts crossing and jamming of the left-hand thread can and sometimes does occur, preventing the assembly from clamping together properly. An additional drawback of the known assembly becomes apparent if cross-threading of the threaded fastener and the welded nut occurs, because torque applied to the fastener in an attempt to unscrew the threaded fastener can instead cause the left-hand threaded thimble to unscrew from the spacer, jamming the entire assembly so that the unit must be cut off. The jamming and cross-threading can slow or stop the production line, increasing manufacturing cost.

In addition, it is difficult to get a good thread when manufacturing the tube components.

Furthermore, the assembly of the component parts of the prior art device requires at least six steps to fasten the mounting part to a vehicle frame.

SUMMARY OF INVENTION

It is the object of the present invention to provide an improved shock mount which avoids the shortcomings of the known shock mount. More particularly, the present invention provides an improved shock mount structure that eliminates the need for left-hand tube threading for assembling the spacer and thimble assembly, and can be more easily assembled with fewer steps in production line assembly than the known shock mount.

It is a further object of the present invention to provide a shock mount combination making use of a spacer and a telescoping thimble for clamping together elastically resilient rings between which is disposed a support part of a vehicle frame, in which a single fastening device serves the dual functions of drawing the parts of the shock mount together and securing the shock mount assembly and vehicle frame to a body mounting part.

The shock mount in accordance with the present invention includes a two-part telescoping spool including a spacer and a thimble. Two mating resilient rings are mounted on each of the spacer and thimble, and the support part of a vehicle frame is disposed between these rings. An elongate fastening device engages the thimble and allows the simultaneous securing of a body mounting part and clamping of the support part.

The spacer includes an annular flange and integral tube projecting perpendicularly from the flange. A first elastically resilient ring is mounted on the spacer tube.

The thimble includes an annular flange and integral tube projecting perpendicularly from the flange. The thimble tube is receivable inside and displaceable axially relative to the spacer tube, such that the spacer and thimble can telescope together. A second elastically resilient ring is mounted on the thimble and secured to the thimble flange.

The thimble tube is engaged by an elongate fastening device which has a head and shank. The shank portion of the elongate fastening device is inserted through an opening in the body mounting part and through the center of the spacer tube, and into the engaging means of the thimble. Manipulation of the fastening device draws the thimble tube into the spacer tube and thereby causes the flanges of the spacer and thimble members to compress the mating elastically resilient rings and the support part disposed between the rings, and simultaneously secures the shock mount and support part to a body mounting part disposed between the spacer flange and the head portion of the elongate fastener. The elongate fastening device will usually comprise a screw threaded fastener, such as a carriage bolt, and will be engaged by screw threading of a nut welded to the end of the thimble flange.

The thimble and the spacer have mutually engaging means for limiting rotation of either of them relative to the other. Preferably, the spacer tube is formed at its axial end opposite the spacer flange into a polygon, as viewed in cross-section. The thimble tube is formed at the tube shoulder adjacent the thimble flange into a complementary polygonal shape, so that the thimble polygon formation can be received in the spacer polygon formation, preventing rotation of the two members relative to each other.

The two-part spool further includes means on the inside of the spacer member for engaging an end portion of the thimble member for resisting separation of the spacer and thimble members when the thimble tube is received in the spacer tube. The engaging means may comprise a plurality of inward protrusions inside the spacer tube which engage an enlarged end of the thimble tube.

The shock mount is assembled by inserting the spacer tube through the center of the first elastically resilient ring and an aperture in the support part. The end of the thimble tube and the associated second elastically resilient ring is then inserted into the spacer tube, and sufficient force is applied for the thimble tube enlarged end to be engaged by the spacer tube inward protrusions. The body part is then seated against the spacer flange, and the threaded fastener is passed through an opening in the body part through and coaxially with the center of the spool parts and engages the threading of the thimble nut. The threaded fastener is tightened, causing the spool parts to telescope together so that the spool flanges compress the resilient rings against the support part, and also securing the shock mount assembly and clamped support part to the body mounting part.

When the threaded fastener is tightened and the shock isolator assembly firmly secured, the clamping load is borne by the spacer tube and the resilient rings. The spool and thimble telescope together, to maintain an even distribution of the clamping load.

The design of the spacer tube polygon shape portion and matching thimble tube polygon shoulder prevents relative rotation by the either part relative to the other. The invention eliminates the need for a left-hand threaded spacer and thimble, thus eliminating the problems of jamming of the assembly associated with the cross-threading of the components of the prior art assembly. Accidental disassembly of the spacer and thimble is prevented by the locking effect of the thimble tube enlarged and engaged by the plurality of the inward protrusions on the spacer tube.

Manufacture of the components is simplified by the design of the improved shock mount, since the need for manufacturing a spacer and thimble with large areas of coarse left-hand is eliminated. Instead, a simple polygonal shape is impressed on the spacer and thimble tube radial surfaces.

Therefore, the improved shock isolator assembly of the present invention represents a substantial improvement over prior art devices because it provides a greater ease of assembly and consequent greater reliability than previously achieved with prior art designs.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 2 is a perspective view of the spacer and thimble components oriented for assembly.

FIG. 3 is a perspective view of an embodiment of a washer having bendable tabs for clipping the washer to a flange.

DETAILED DESCRIPTION OF THE PREFERRED EMBODIMENTS

Figure 1:
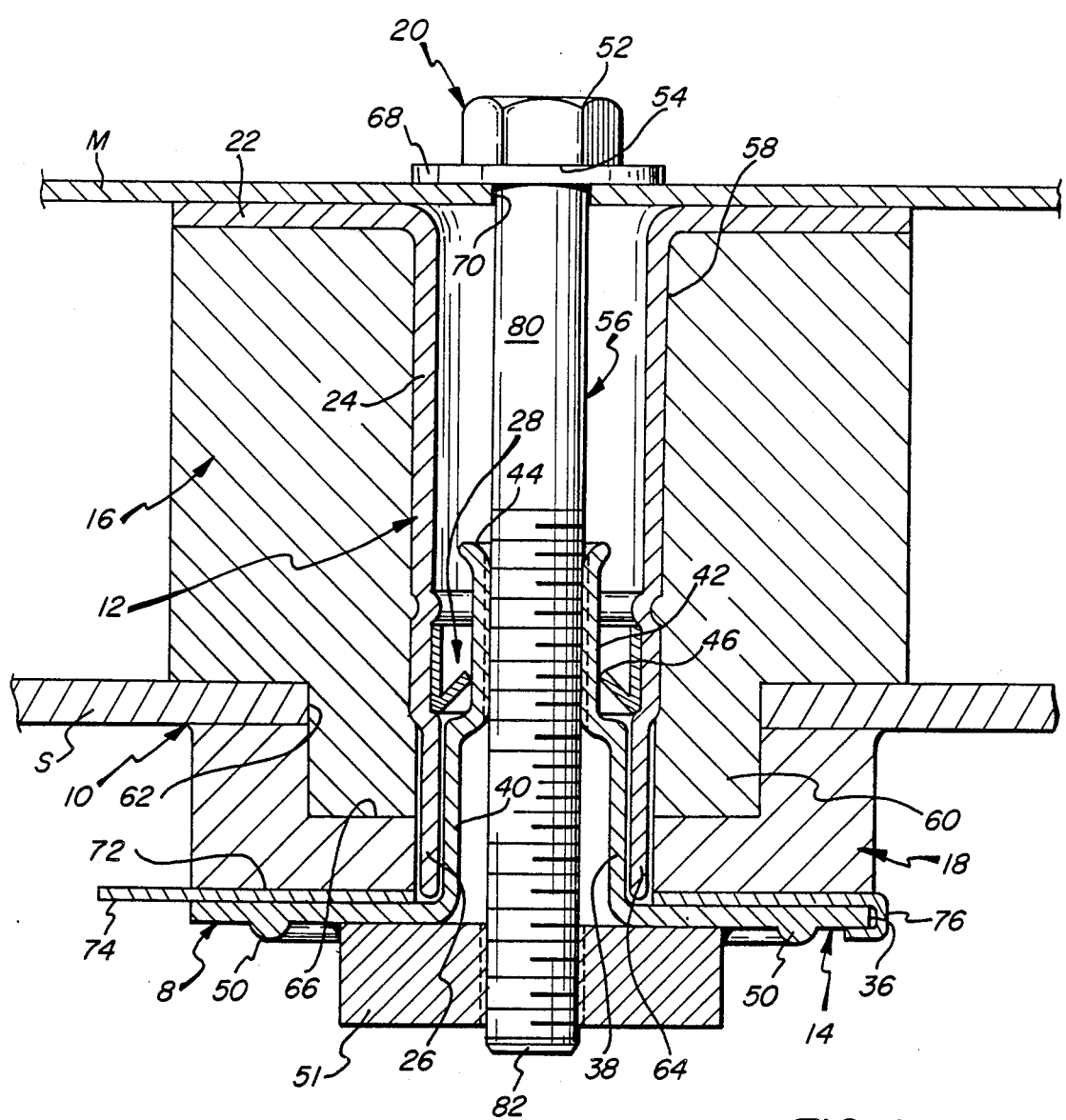
FIG. 1 is a vertical cross-sectional view of the assembled shock isolating mount.

As shown in FIGS. 1, 2, and 3 the isolator assembly of the present invention, generally indicated at 10, comprises a two-part spool, generally indicated at 8, which includes a spacer, generally indicated at 12, a thimble, generally indicated at 14, a first elastically resilient mating ring, generally indicated at 16, a second elastically resilient mating ring, generally indicated at 18, and a threaded fastener, generally indicated at 20. In the preferred embodiment, the spacer 12, shown in FIGS. 1 and 2, includes an annular flange 22 integral with a tube 24 extending perpendicularly from the flange 22. Spacer tube 24 for a portion of the its axial end opposite the spool flange 22 when viewed in axial cross-section, has the form of a polygon, shown as a hexagon portion 26. The spacer tube further includes a plurality of inward protrusions which is shown as a six tab washer 28. The six tab washer 28 is held in place at the spacer tube end 26 opposite the spacer flange 22 by the constriction of the tube caused by forming a portion of the tube end into a hexagon 26. The six tab washer is held in place at the spacer flange end by two indents 34 in the spacer tube wall.

Inserted into the spacer 12 is the thimble 14. The thimble includes an annular thimble flange 36 integral with a thimble tube 38. The thimble flange 36 is formed, in the preferred embodiment, with a raised ring 50 located on the axial face opposite the thimble tube 38. Threaded nut 51 is spot welded onto the flange 36, and the raised ring 50 serves to center the threaded hole of the nut 51 over the thimble tube 38. The thimble tube 38 has two distinct portions 40 and 42. The tube shoulder portion 40 located between the thimble flange 36 and tube cylindrical portion 42 is formed into a polygon shape when viewed in axial cross-section, which in the preferred embodiment is a hexagon. The hexagon shoulder portion 40 is congruent with shape of the spacer tube portion 26, but has a perimeter slightly less than the perimeter of the interior of the hexagon portion 26. The thimble tube hexagonal shoulder 40 may thus be fitted into the spacer tube hexagonal portion 26, such that each piece engages the other, and neither the spacer nor the thimble will rotate relative to each other.

The thimble is further formed with a tube cylindrical portion 42 extending beyond the hexagonal shoulder portion 40. The thimble tube cylindrical portion has an outer diameter which is less than the outer diameter of the thimble tube hexagonal shoulder.

The thimble tube cylindrical portion has an axial length such that when the thimble is inserted into the spacer the cylindrical portion extends beyond the tips 46 of the tabs of six tooth washer 28. The cylindrical portion of the thimble tube has an enlarged end 44. When the thimble tube 38 is inserted into the spacer tube 24 the thimble tube enlarged end 44 is engaged by the six tab washer 28. The washer tabs 30 are bent away from the spacer tube 24 walls at an angle of approximately 45 degrees to allow the thimble tube flared end 44 to be easily pressed into the six tab washer 28. The washer is made from a resilient material, such as spring steel or plastic, so that the tabs 30 will bend towards the walls of tube 24 when the thimble tube enlarged end 44 passes through the circle described by the tips of the six tabs washer 46, yet will return to their original inclination after the thimble tube flared end 44 has been received by the six tab washer 28. Once inserted, the thimble 14 is prevented from accidental disengagement from the spool 12 by the six tab washer 28 engaging the enlarged end 44.

While the plurality of inward protrusions is described and illustrated as a six tab washer 28, any other method of providing a series of gripping or restraining tabs or surfaces that will allows the easy insertion of the thimble tube 38 into the spacer tube 24 and will lock the thimble tube in place to prevent inadvertent disassembly may be provided. For example, a rubber O-ring could be mounted within the spacer tube 24 to yield a frictional locking effect.

The threaded nut 51 may be welded to the outer face of thimble flange 36 and is engaged by threaded fastener 20 when the shock mount is assembled. It should be noted that unlike the prior art design, that the nut 51 can be easily located and centered because nut 51 is sized to fit exactly within the boundaries of raised ring 50. The corners of the nut 51 may then be welded onto the flange 36, and the nut 51 will be perfectly centered.

The threaded fastener 20 includes a head 52 configured to be engaged by a tool for applying torque about the fastener axis. For example, the head may be slotted to receive a flat or phillips head screwdriver or may be formed as shown with a hexagonal shape in plan view to provide wrench flats for receiving a wrench. The head 52 is formed with a load bearing surface 54 that extends generally perpendicularly from the fastener axis. The fastener further includes a shank, generally indicated at 56 that extends perpendicularly from the load bearing surface 54 and includes a cylindrical, unthreaded portion 80 and a threaded portion 82 that extends coaxially with the unthreaded portion 80. The threaded portion 82 is adapted to be received by the threaded nut 51.

The elastically resilient mating rings 16 and 18 are formed from a durable shock absorbing material such as rubber or other polymeric compounds. When the entire isolator is assembled the resilient rings serve to insulate the body part M from the transmission of vibrational shocks from the support S. It should be noted that the shock mount 10 may be mounted with a support S located between the first and second resilient rings 16 and 18 and the body part M located between the head 52 of the threaded fastener 20 and the spacer flange 22, or alternatively, the body part M may be located between the first and second resilient rings 16 and 18 and the support S may be located between the head 52 of the fastener 20 and the spacer flange 22.

In the preferred embodiment the first resilient ring 16 is an annular cylindrical body, with an outer diameter equal to the diameter of the spacer flange 22. The first resilient ring has a hole or aperture 58 that is centered in the first resilient ring 16. The hole 58 has a diameter equal to the outer diameter of the spacer tube 24. Accordingly, the first resilient ring may be frictionally fitted onto spacer tube 24. The first resilient ring 16 further includes a projecting portion 60. The projecting portion 60 of the first resilient ring is intended to be received by an opening 62 in the support part S. The body mounting part opening 62 therefore must be cut or punched out in the same shape as the projecting portion 60 of the first resilient ring. The mounting part hole 62 should be slightly larger in size than the projecting portion 60. Preferably, the projecting portion 60 is a circular cylinder.

The second elastically resilient ring 18 is also formed as an annular cylindrical body and has an outer diameter equal to the diameter of the thimble flange 38. The second resilient ring has a hole 84 that is centered in the second resilient ring. The hole 64 has a diameter equal to the outer diameter of spacer tube 24, and is the same as the diameter of the hole 58 in the first resilient ring. The hole 64 diameter is thus larger than that of the diameter of the spindle tube shoulder portion 40 and the tube cylindrical portion 42. The second resilient ring 18 has at one axial end a cavity 66 which receives the first resilient ring projecting portion 60. The cavity 66 should be slightly larger than the projecting portion 60, and should be of the same geometric shape as the projecting portion 60.

A washer may be molded into the resilient rings 16 and 18 to allow preassembly of the rings to the spacer and spindle members. For example, a washer 72 is molded into the axial end of the second elastically resilient ring 18 adjacent the flange 36. The washer 72 has an inner and outer diameter sized to match the inner and outer diameter of the second elastically resilient ring 18. The washer 72 includes means for securing the second ring 18 to the thimble 14. In one embodiment of the securing means, shown in FIG. 3, the washer 72 has four bendable tabs 74 extending from its outer perimeter, each tab being separated by 90 degrees from adjacent tabs 74. Tabs 74 are sufficiently bendable that they may be clipped or crimped to the thimble flange 36. Bent tab 76, shown in FIG. 1, is bent around the edges of the thimble flange 36 when the second resilient ring 18 is seated onto the thimble 14, so as to secure the second resilient ring 18 to the thimble flange 36.

It has been found that preassembly of the resilient rings 16 and 18 to the spacer 12 and thimble 14 allows for a faster production line assembly of the vehicle mounting part M to the support S, as it eliminates the production line steps of mounting the resilient rings 16 and 18 onto the spacer tube 24.

In the assembled shock mount 10 shown in FIG. 1, the support S is clamped between the first and second resilient rings 16 and 18 by the compressive action of the thimble flange 36 being drawn toward the spacer flange 22 by the engagement of the threaded fastener 20 with the threaded nut 51.

The threaded fastener 20 is inserted through a washer 68 and an opening 70 in the body mounting part M through the center of and coaxially with spacer tube 24. The threaded fastener 20 engages the nut 51 and when tightened, clamps the assembly together and secures it to the support, to provide a reliable and secure isolator and fastening assembly.

The unique design and assembly of the components of the present invention enhance the economy and reliability of assembly since the spacer and thimble assembly may be easily aligned and engaged. The assembled shock mount assures secure clamping of the body part because of the telescoping design of the spacer and thimble. The problem of cross-threading and consequent jamming of the spool and thimble of the prior art devices is eliminated. The present invention also provides for partial preassembly of the shock mount by mounting the resilient rings to the spacer and thimble members, thus reducing production line assembly time and cost.

What is claimed is:
1. An assembly for securing a mounting part of structure onto a support, comprising:
   a rigid spacer member having a spacer flange and a spacer tube integral with the spacer flange and projecting from said spacer flange to extend through apertures in resilient bodies and said support disposed between said bodies;

a rigid thimble member having a thimble flange and a thimble tube integral with the thimble flange and projecting from said thimble flange, said thimble tube being receivable inside and displaceable axially relative to said spacer tube, said thimble member and said spacer member having mutually engaging means for limiting rotation of either of them relative to the other;

an elongate fastening device having a shank, a head portion, and an end portion, said head portion disposed outside said spacer member and said mounting part disposed between said spacer flange and said head portion, said shank extending through said spacer tube, and said end portion and said thimble tube having cooperating means operable by manipulation of said fastening device to draw said thimble tube into said spacer tube and thereby draw said spacer and thimble flanges together and against said bodies, securely clamping said bodies and said support between said flanges, and to secure said mounting part to said support.

2. The assembly of claim 1, where said rotation limiting means comprises mutually fitting polygonal formations on said spacer and tubes.

3. The assembly of claim 2, where said polygonal formations are hexagonal.

4. The assembly of claim 1, further comprising means on the inside of spacer member for engaging an end portion of said thimble member and for resisting separation of said members when said thimble tube is received in said spacer tube.

5. The assembly of claim 4, where said separation resisting means comprises a plurality of inward protrusions inside said spacer tube and wherein said end portion of said thimble tube is enlarged and engageable by said protrusions.

6. The assembly of claim 1, said cooperating means comprising matching screw threads formed respectively on the outside of said fastener end portion and on the inside of a nut located on said thimble flange.

7. The assembly of claim 6, wherein said thimble flange has a raised ring on its outer face, and said threaded nut engageable by said fastener end portion is sized to fit within said raised ring and is welded to the outer face of said thimble flange within said raised ring.

8. The assembly of claim 1, wherein said resilient bodies comprise elastically resilient annular bodies, and wherein at least one said elastically resilient annular body has molded in one end thereof a washer having means for securing said at least one annular body to one of said flanges.

9. The assembly of claim 8, wherein said securing means comprises bendable tabs extending from the outer periphery of said washer sized and adapted to be bent over to clip onto the outer perimeter of said thimble flange.

10. The assembly of claim 8, wherein said mounting part is disposed and clamped between said first and second resilient rings and wherein said support is disposed between said spacer flange and said fastener head portion.

11. A shock isolating mount for securing a mounting part of a heavy structure to an apertured support, comprising:

a spacer including a flange and tube, said spacer tube projecting from said spacer flange, said spacer tube being formed at a portion of its axial end opposite said spacer flange into a hexagon shape, and the internal radius of said tube having a plurality of inward protrusions;

a first elastically resilient ring having a projecting cylinder at one axial end thereof sized to fit into said aperture in said support, said spacer tube extending through the center of said first resilient ring and said spacer flange being seated against the other axial end of said first resilient ring;

a thimble including a flange and tube, said thimble tube projecting from said thimble flange and being formed for a portion of its axial end adjacent said thimble flange into a hexagon shape, said thimble tube portion adjacent said thimble tube hexagonal portion being into formed a cylinder, said thimble tube cylinder portion being enlarged at its axial end opposite said thimble flange, said enlarged end being engaged by said plurality of inward protrusions when said thimble tube is received in said spacer tube; said thimble flange having a threaded nut welded to its outer face;

a second elastically resilient ring having a cylindrical cavity sized to receive said projecting portion in one axial end, and a washer in the other axial end, said washer having bendable tabs extending from its outer perimeter for clipping said second resilient ring to said thimble flange; and a threaded fastener inserted through an opening in said mounting part and projecting coaxially and centered within said spool tube and engaging said threaded nut to simultaneously clamp said support between said first and second resilient rings and to secure said shock mount and clamped support to said mounting part.

12. A shock isolating mount in accordance with claim 11, wherein said first elastically resilient ring has molded in one axial end thereof a washer, said washer having bendable tabs extending from its outer perimeter for clipping said first resilient ring to said spacer flange when said first resilient ring is mounted on said spacer tube.

13. A shock isolating mount in accordance with claim 11, wherein said projecting portion is sized to fit into an aperture in said mounting part and wherein said threaded fastener is inserted through an opening in said support and engages said threaded nut to simultaneously clamp said mounting part between said first and second resilient rings and to secure said shock mount and clamped mounting part to said support.

14. In a shock mount for clamping together elastically resilient bodies and holding a part placed between them, a spool device comprising:

a rigid spacer member including an annular flange integral with a spacer tube projecting from an inner side of said flange, and a rigid thimble member including an annular flange integral with a thimble tube projecting from it, said thimble tube fitting and being displaceable axially inside said spacer tube and having means for preventing rotation of said thimble relative to said spacer, said thimble flange having an internally screw-threaded nut secured thereto to receive a threaded fastener extended into it through said spacer tube.

15. A shock mount according to claim 14, wherein said resilient bodies comprise polymeric annular bodies having holes therein, one said polymeric annular body being frictionally fitted on said spacer tube and a second said polymeric annular body being mounted on said thimble member by means for securing said annular body to said thimble flange with said thimble tube extending through said hole of said second polymeric annular body.

16. A shock mount according to claim 15, wherein said securing means comprises a washer having tabs extending from its outer perimeter for clipping said second polymeric annular body to said thimble flange molded into said second polymeric annular body.

17. A shock mount according to claim 14, further comprising means formed on the inside of said spacer member for engaging an end portion of said thimble member and resisting separation of said members are fitted together.

18. A shock mount according to claim 14, wherein said rotation preventing means comprises forming said thimble and spacer tube into interfitting polygonal shapes.

* * * * *